US 6,693,666 B1

(12) United States Patent
Baker et al.

(10) Patent No.: US 6,693,666 B1
(45) Date of Patent: Feb. 17, 2004

(54) MOVING IMAGER CAMERA FOR TRACK AND RANGE CAPTURE

(75) Inventors: Henry H. Baker, Los Altos, CA (US); John I. Woodfill, San Francisco, CA (US); Pierre St. Hilaire, Belmont, CA (US); Nicholas R. Kalayjian, Long Beach, CA (US)

(73) Assignee: Interval Research Corporation, Palo Alto, CA (US)

( * ) Notice: Subject to any disclaimer, the term of this patent is extended or adjusted under 35 U.S.C. 154(b) by 0 days.

(21) Appl. No.: 08/989,202

(22) Filed: Dec. 11, 1997

Related U.S. Application Data

(60) Provisional application No. 60/032,761, filed on Dec. 11, 1996.

(51) Int. Cl.$^7$ .......................... H04N 5/225; H04N 5/228
(52) U.S. Cl. ................... 348/219.1; 348/208.14
(58) Field of Search ..................... 348/169, 208, 348/219, 316, 347, 348, 357, 97, 308, 208.4, 208.5, 208.6, 208.7, 208.14, 219.1, 79, 240.99; 359/676

(56) References Cited

U.S. PATENT DOCUMENTS

| | | | | |
|---|---|---|---|---|
| 3,946,696 A | * | 3/1976 | Lubnow | 114/221 R |
| 4,418,993 A | | 12/1983 | Lipton | |
| 4,717,958 A | * | 1/1988 | Gal et al. | 348/208 |
| 5,004,328 A | | 4/1991 | Masayuki | |
| 5,049,988 A | | 9/1991 | Sefton et al. | |
| 5,063,441 A | | 11/1991 | Lipton et al. | |
| 5,142,357 A | | 8/1992 | Lipton et al. | |
| 5,206,503 A | | 4/1993 | Toops | |
| 5,270,861 A | * | 12/1993 | Estelle | 359/676 |
| 5,402,171 A | | 3/1995 | Tagami et al. | |
| 5,440,343 A | * | 8/1995 | Parulski et al. | 348/316 |
| 5,453,784 A | * | 9/1995 | Krishnan et al. | 348/348 |
| 5,453,785 A | * | 9/1995 | Lenhardt et al. | 348/357 |
| 5,548,327 A | * | 8/1996 | Gunday et al. | 348/97 |
| 5,633,491 A | * | 5/1997 | Kasdan | 348/79 |
| 5,712,483 A | * | 1/1998 | Boone et al. | 250/367 |
| 5,721,608 A | * | 2/1998 | Taniguchi | 355/53 |
| 5,812,191 A | * | 9/1998 | Orava et al. | 348/308 |
| 5,819,120 A | * | 10/1998 | Hamada et al. | 396/77 |
| 6,204,880 B1 | * | 3/2001 | Nishimura | 348/240.99 |

FOREIGN PATENT DOCUMENTS

| | | |
|---|---|---|
| DE | 4304529 C | 6/1994 |
| EP | 0512403 A | 11/1992 |
| GB | 2210530 A | 6/1989 |
| JP | 07303207 A | 11/1995 |

* cited by examiner

Primary Examiner—Wendy R. Garber
Assistant Examiner—Luong Nguyen
(74) Attorney, Agent, or Firm—Van Pelt & Yi LLP

(57) ABSTRACT

A precision motion platform carrying an imaging device under a large-field-coverage lens enables capture of high resolution imagery over the full field in an instantaneous telephoto mode and wide-angle coverage through temporal integration. The device permits automated tracking and scanning without movement of a camera body or lens. Coupled use of two or more devices enables automated range computation without the need for subsequent epipolar rectification. The imager motion enables sample integration for resolution enhancement. The control methods for imager positioning enable decreasing the blur caused by both the motion of the moving imager or the motion of an object's image that the imager is intended to capture.

22 Claims, 8 Drawing Sheets

MOVING IMAGER CAMERA FOR TRACK AND RANGE CAPTURE

CROSS-REFERENCE TO RELATED APPLICATION

This application claims the benefit of Baker et al.'s U.S. Provisional Patent Application No. 60/302,761, entitled "MOVING IMAGER CAMERA FOR TRACKING, SCANNING, RANGE AND SUPER-RESOLUTION," filed Dec. 11, 1996, which is incorporated herein by reference in its entirety. This application is related to Woodfill et al.'s copending U.S. patent application Ser. No. 08/839,767, filed Apr. 28, 1997, entitled "Data Processing System and Method," which is incorporated herein by reference in its entirety.

TECHNICAL FIELD

This invention relates generally to computer input devices, and more particularly to digital image capture devices used to provide ranging and tracking information for a computer system.

BACKGROUND ART

The range of an object, i.e. the distance to the object from an observation site, can be determined by the analysis of two or more spatially separated images (often referred to as "binocular images" when there are two images) that are taken from the observation site. In range computation from simultaneously acquired binocular digital images, the area of processing is limited to the visible region of overlap between the two images. To maintain a reasonable region of overlap usually necessitates redirecting the optical axes of the cameras (i.e. changing their vergence) which introduces other problems including a usual necessity to resample the imagery. As is well known to those skilled in the art, "vergence" means the angle between the optical axes of the lenses.

The processing of binocular or multi-view imagery for range computation is easiest when the optical axes are parallel and the imaging surfaces are coplanar—in what is termed parallel epipolar geometry. Because verging the optical axes to optimize the region of image overlap eliminates image-surface co-planarity, the complexities of calculating range increases significantly with non-parallel viewing. This is further compounded when viewing objects at a variety of azimuths and distances where adjustments in the view direction as well as verging would be necessary to retain sufficient image overlap.

For computational purposes, the frame of reference for scene description is usually tied to image location, so changing the image location through vergence adjustments necessitates reconfiguring the frame of reference. Again, adjusting a system's frame of reference increases the computational and conceptual complexity of its analysis.

A similar situation arises for typical monocular (i.e. single image) computer analysis of tracking and scanning in some space before the camera. With subjects able to operate over a broad region before the camera, continued observation generally involves use of either wide-angle optics or a panning/tilting mechanism to properly direct the camera's view direction. These control mechanisms are relatively complex, must move fairly large pieces of equipment (cameras and their lenses), and alter the underlying geometric frame of reference for scene analysis by rotating the frame of reference with the cameras. In addition, the use of wide angle optics works against high resolution analysis, as only larger scene detail is visible.

One approach to solve these acquisition problems in image-based range and tracking computation would be to employ greatly oversized imagers (e.g. imagers having about 3K by 3K or $9 \times 10^6$ elements), and select corresponding standard-sized windows within these for processing. However, such an approach would be prohibitively expensive. For example, a 1K by 1K imager sells for well over a thousand dollars. Higher resolution imagers are available at considerably greater price.

A prior art solution to the apparent dichotomy between simple processing (with parallel epipolar geometry) and broad depth and tracking coverage exists in adaptation of perspective-correcting lens systems as used in "view-camera" or "technical-camera" designs. In such designs, an oversized lens is used to image the scene, and lateral repositioning of the lens or imaging platform can be used to redirect the camera without rotating the imaging surface. For single camera use this enables maintaining lines parallel in the world parallel on the image plane; in ranging camera use it enables parallel epipolar geometry.

For example, in U.S. Pat. Nos. 5,063,441 and 5,142,357 of Lipton et al., devices for use in 3D videography are disclosed. More particularly, Lipton et al. teach devices for capturing binocular images for use in stereo videography (stereo movies), with reduced viewing eyestrain, by using dual and triple camera systems. Briefly stated, Lipton et al. teaches an imager controller for epipolar stereo capture in videography, including stereo lenses mounted fixedly together in a single housing. Stereographics Inc., of San Raphael, Calif., produces a product embodying elements of the Lipton et al. patents.

In the matter of two-dimensional imager control, U.S. Pat. No. 5,049,988, of Sefton et al. teaches a system that provides the display of a video capture window for surveillance applications. Phillips, in U.S. Pat. No. 4,740,839, teaches a TV surveillance system operated by sub-sampling a conventional camera, with a result that resembles the Lipton et al. approach of image capture.

As will be appreciated, image capturing of the prior art uses planar sensors due to the high cost, lack of availability, and complexities involved with the use and manufacture of curved or "spherical" sensors. However, spherical sensors have a number of advantages with respect to field of view, view direction, and use in stereo image capture that designers of prior art digital imaging cameras have apparently failed to consider.

DISCLOSURE OF THE INVENTION

The present invention includes a multi-image camera system for automated stereo ranging applications that provides high-resolution broad field coverage over a wide range of subject distances while enabling retention of the epipolar constraints necessary for efficient stereo matching. At the same time, the multi-image camera of the present invention supports monocular image applications such as object tracking.

In one embodiment of the present invention, an imaging device is preferably placed on a three-degree-of-freedom linear motion positioning mechanism whose position can be controlled by a computer. Broad field coverage is preferably attained through use of a wide-angle large-coverage lens (e.g. a lens designed for a 35 mm camera). High resolution is attained through placing the imaging device under the large-coverage lens, so the imaging device's immediate field of view is considerably narrower than that provided by the lens.

In contrast with traditional view-camera usage, the present invention teaches moving the imaging surface instead of the lens. This allows the apparatus to retain co-planarity of the images and, so long as the displacements can be determined to sub-pixel accuracy, maintains a stable frame of reference for the analysis, all while providing the required view re-directions. Moving the lens alters the projective relationships among observations, whereas moving the imager does not.

Image focus may be attained through the traditional rotating-travel focus adjustment although, for quantitative computational tasks, this is often unsatisfactory as the center of projection may vary with lens rotation. For this situation, our preferred embodiment of the moving imager provides a back-focus capability, as will be described below.

Computer control of the platform enables positioning accuracy in the micron range. Stepper motors, for example, operating with full step positioning, can position a platform along an axis to within a few microns of the desired position. Differential stepper control enables increasing the accuracy of this placement (the number of locations where this precision is attainable) by one to two orders of magnitude. Fine specification of absolute imager location can also be attained through use of interferometers or sonar-based ranging systems, as will be described below in more detail.

The planar imaging embodiment of the present invention enjoys a number of advantages over related devices of the prior art. In the present invention, an oversized lens is used to provide a wide field of view of the scene. Movement of the imaging surface under the lens provides high-resolution view selection, which is the equivalent of view redirection of pan and tilt motions without the need for a complex mechanism for accomplishing such motions. With accurate positioning knowledge, this form of imaging provides a stable frame of reference for scene computation. Accurate positioning information may be attained using the positioning and control systems described below.

Furthermore, the apparatus of the present invention provides an economical solution to the aforementioned problems of the prior art. For example, the present invention is operable with relatively economical high-precision imagers that use displacement for direction selection in tracking, scanning, and range computation. More particularly, certain embodiments of the present invention place an imaging device on a three-degree-of-freedom linear motion platform whose position can be controlled by a computer to efficiently and economically provide the desired direction selection. The third degree of freedom provides back-plane focus control. Back-plane focusing has an advantage for traditional lens designs where focus from element rotational displacements causes image centering variations.

In a spherical camera embodiment of the present invention, image capture is effected through spherical focal-plane imaging using, for example, a spherical-faced fiber-optic faceplate. One lens suitable for this embodiment, the Baker Ball lens, is described in a wartime report referenced below. In this spherical-imaging embodiment of the present invention, a mechanism is provided that shares many of the design considerations of the above-described linear moving-imager camera. Preferably, this embodiment uses a high resolution imaging device (1K by 1K elements with 12 bits of resolution at each pixel), mounted behind a fiber-optic faceplate that transfers the focal-plane light pattern to the sensor elements of the imager. Notable in this embodiment of the moving imager is that the lens system has no particular optical axis or axis along which any imaging surfaces are preferentially oriented.

In addition, the spherical camera embodiment of the present invention has a number of advantages over prior art planar imaging cameras. For example, the spherical camera embodiment we describe has 1) excellent optical resolution attainable since the focal surface does not need to be made planar (the lens is diffraction limited); 2) greater simplicity due to the advantages of rotational over linear displacements; 3) a greatly increased undistorted field of view; 4) exponentially less lens illumination fall-off with eccentricity (cosine of radial displacement rather than the fourth power of the cosine); 5) greater effective pan and tilt velocities; and 6) opportunity to study (via simulation) aspects of human psychophysical behavior in a mechanism of similar geometry.

Certain embodiments of the present invention, both of the linear and spherical lens, provide lenses in multiple housings to increase the flexibility, reliability, and range finding quality of the system. A monocular version of the present invention requires only a single lens, and multi-lens versions of the present invention can use two or more lenses, for multi-image ranging analysis.

These and other advantages of the present invention will become apparent upon reading the following detailed descriptions and studying the various figures of the drawings.

BEST MODES FOR CARRYING OUT THE INVENTION

Figure 1:
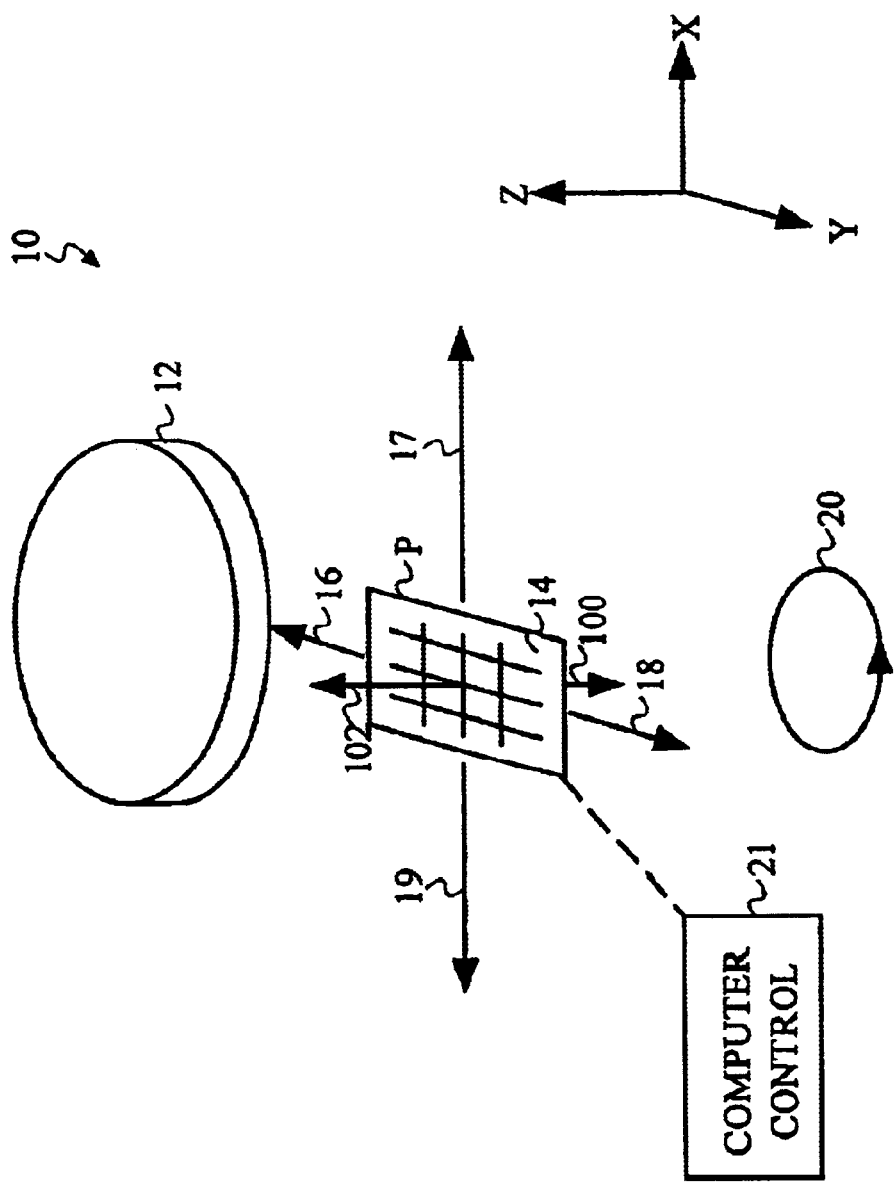
FIG. 1 is a diagrammatic view of a monocular imager in accordance with the present invention.

With reference to FIG. 1, a monocular imager apparatus or moving imager "camera" 10 in accordance with one embodiment of the present invention will now be described. The moving imager camera 10 includes a lens 12, and an imaging array, imaging device, or "imager" 14. As indicated by the arrows 16, 17, 18, 19, 100, and 102, the imager is capable of independent motion along the three degrees of freedom defined by an X-Y-Z axis. This means that the imager 14 can move both in-plane and out-of-plane with respect to the lens 12 for view selection and focus, and may also be synchronized for rectangular displacements 20 in the imager plane P to provide super-resolution frame integration. The displacements 20 are preferably rectangular, although they are represented by a circle in this figure. As will be appreciated by those skilled in the art, "rectangular" means any appropriate movement of the imager in the plane P to provide the necessary local sampling. For example, these rectangular type displacements are described in Tagami et al.'s U.S. Pat. No. 5,402,171, issued Mar. 28, 1995.

Preferably the motions of the moving imager camera 10 are controlled by a computer controller 21 through the use of suitable transducing mechanisms. While high precision encoders or the like may be workable, it is preferable that an extremely high precision measurement system such as one utilizing an interferometer or sonar based mechanism be used. For imparting motion, an actuator such as a stepper motor is suitable. A variety of commercially available actuators are suitable for imparting motion along the X, Y and Z axes. For example, a stepper motor, along with appropriate gearing and linkages, available from Physik Instruments of Germany (with suppliers in the U.S.) has been found to be suitable for imparting these motions. Those skilled in the art will be familiar with the design and implementation of the various actuators, high precision measurement systems, and the necessary computer control. A few illustrative embodiments of actuators and measurement systems suitable for controlling and determining the position of the imager 14 will be described in more detail below.

The lens 12 can be a relatively inexpensive, wide angle lens, commercially available from a variety of sources. For example, a 35 millimeter ("mm") camera lens works well for the present invention. One suitable imager 14 is an imaging array having a resolution of at least 512×512 pixels, although imaging arrays of lesser resolution will work. Such imaging arrays are available from a variety of sources, including Sharp Electronics, Inc. of Japan (with suppliers in the U.S.). Another contemplated imager 14 is a photosensitive integrated circuit having an array of photosensitive elements. One advantage in this particular embodiment is that significant processing of the signals generated at the photosensitive elements could be performed locally within the photosensitive integrated circuit.

Figure 2:
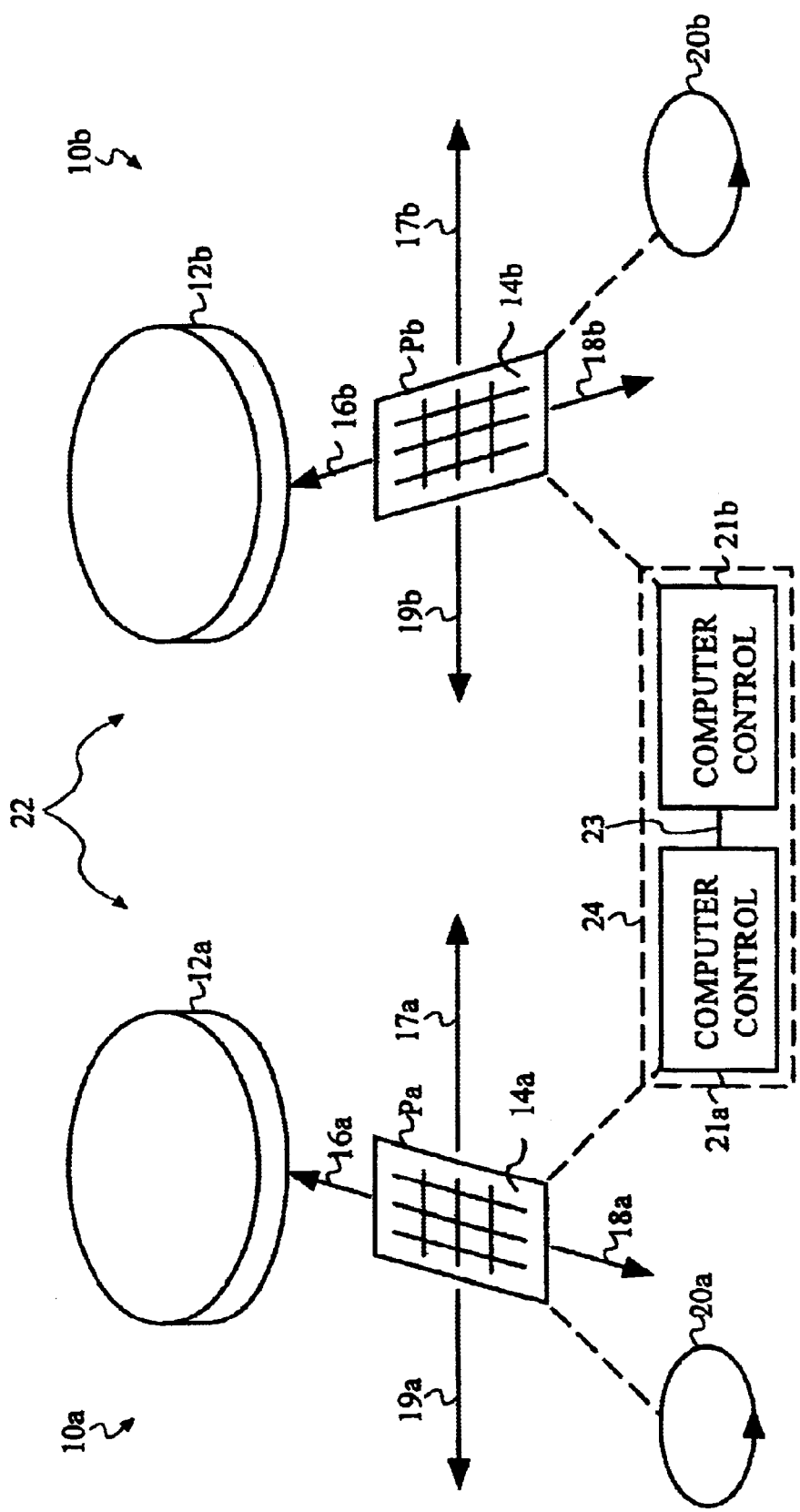
FIG. 2 is a diagrammatic view of a multi-camera (binocular in this case) imager in accordance with the present invention.

In FIG. 2, a multi-camera or "binocular" version of the present invention is illustrated. More particularly, an imager apparatus or "camera" 22 includes a pair of independent monocular apparatus 10a and 10b (see FIG. 1 for corresponding elements) that are operated in concert. However, it should be noted that any number n of monocular apparatus 10 can be used, in concert, for particular applications. For example, n=3, 4, 5, or 6 are useful for certain applications.

The apparatus 10a includes a lens 12a, and an imaging array or "imager" 14a. As noted by the arrows 16a, 17a, 18a, and 19a, the imager 14a is capable of independent in-plane motion with respect to the lens 12a for view selection. In certain embodiments, the imager 10a may also move in the out-of-plane direction for focus control. In addition, the imager 14a is preferably synchronized for rectangular displacements (as described above with reference to FIG. 1) 20a in the plane Pa of the imager to provide super-resolution frame integration. The various components of the apparatus 10a (e.g. the lens, motion actuators, imager, etc.) are as described previously with respect to the apparatus 10 of FIG. 1.

Similarly, the apparatus 10b includes a lens 12b, and an imaging array or "imager" 14b. As noted by the arrows 16b, 17b, 18b, and 19b, the imager 14b is capable of independent in-plane motion with respect to the lens 12b for view selection. In certain embodiments, the apparatus 10b may also move in the out-of-plane direction for focus control. In addition, the imager 14b is preferably synchronized for rectangular displacements (as defined above) 20b in the plane Pb of the imager to provide super-resolution frame integration. The various components of the apparatus 10b (e.g. the lens, motion actuators, imager, etc.) are as described previously with respect to the apparatus 10 of FIG. 1.

The apparatus 10a and 10b of camera 22 operate as follows. The lateral motions 17a and 19a of apparatus 10a and the lateral motions 17b and 19b of apparatus 10b are independent so that the two devices can be moved for pan and vergence. However, vertical motions 16a and 18a of apparatus 10a and 16b and 18b of apparatus 10b are coupled together either mechanically or through computer control for tilt control, as will be appreciated by those skilled in the art. Likewise, the rectangular displacements 20a and 20b are synchronized for super-resolution integration. These independent and synchronized displacements can be easily accomplished by computer control 21a and 21b (each similar to computer control 21 of apparatus 10 of FIG. 1 and mutually communicating by a communication link 23) or by a unitary computer control 24.

Figure 3:
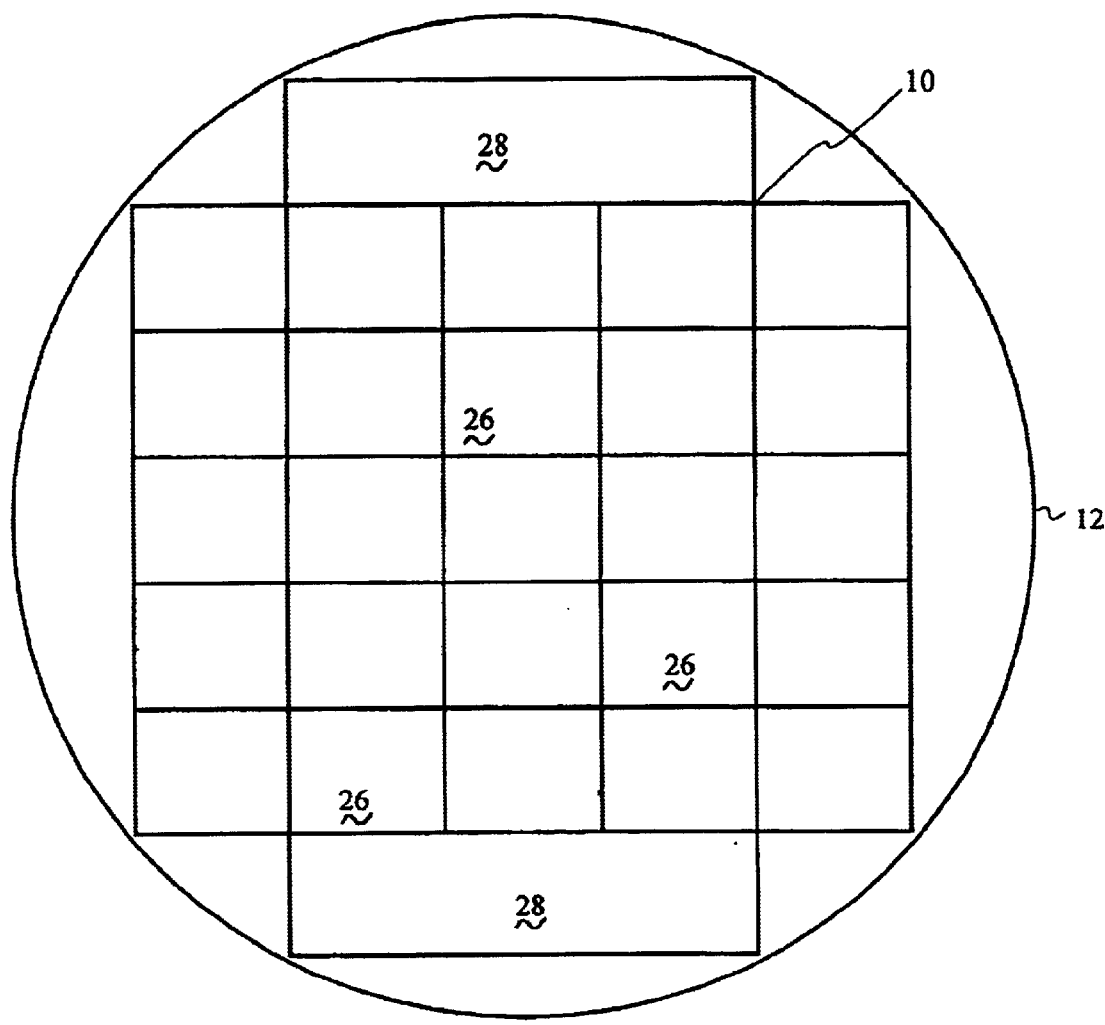
FIG. 3 is an illustration of an imager under a wide angle lens of the present invention.

In FIG. 3, a greatly enlarged field of coverage 10 of a lens 12 is illustrated. Each rectangle 26 represents a potential location of the imager 10 in the lens' field of coverage as intended for capture by 35 mm film. "Additional areas" 28 are not typically used in film photography, but are accessible to the present invention. In fact, the entire area 12 can be sampled by the method and apparatus of this invention. For example, a ⅓ inch 4:3 imager provides 5 times lateral and 5 times vertical coverage, for an effective field of 3200 by 2400 (or more) for a nominal 640 by 480 pixel imager 10, selected as the "standard" image size under NTSC standards.

As noted previously, in the present invention, an imaging device is placed on a three-degree-of-freedom linear motion mechanism whose position can be controlled by a computer. Relatively broad field coverage is preferably attained through use of a wide-angle large-coverage ("wide," e.g. 45 degree or larger field of view) lens. High resolution is attained by placing the imaging device under the wide lens, so the sensor's immediate field of view is considerably smaller than that provided by the lens.

For example, for a 6 mm-wide imaging device under a 50 mm lens, the lens' 45 degree field of view is reduced to approximately 45 ×(6/35)=7.7 degrees at the sensor array, making it act as an approximately 400 mm lens at the sensor, and increasing pixel resolution by a factor of about 6 in each direction. Super-resolution integration techniques can more than double this to a factor of about 12 in each direction, as will be appreciated by those skilled in the art.

Computer control of the motion platform upon which the sensor array resides enables positioning accuracy in the micron range. Stepper motors and other precision actuators for accomplishing this control are well known to those skilled in the art. Stepper motors operating with full step positioning can position a platform at discrete positions along an axis to within a few microns. Differential stepper control enables increasing the accuracy of this placement by one to two orders of magnitude.

Figure 4:
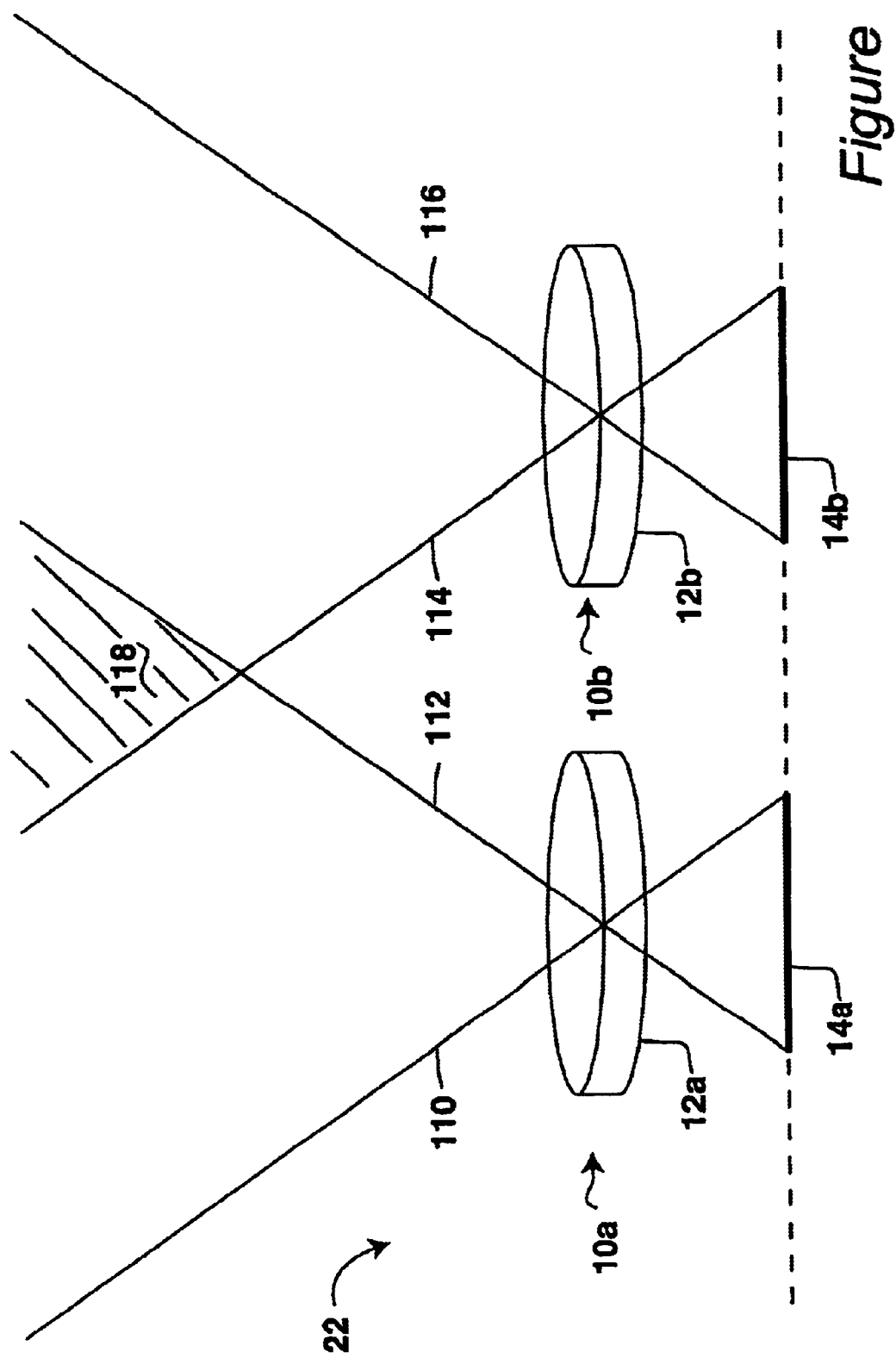
FIGS. 4 and 5 illustrate the use of a binocular imager in adjusting the range of available stereoscopic images in accordance with the present invention.

For fine determination of absolute imager location, a pair of interferometer or sonar-based ranging systems can be provided that measure the positions of the sensors in the focal plane to sub-micron precision during image capture. Since each imaging cell is about 10 microns across in a current embodiment, this enables sufficient sub-pixel precision to keep the range estimates coherent across the operational field of view. In the present example, interferometric measurement and differential stepper control may provide better than 3 bits of sub-pixel localization over the range of motion With reference to FIGS. 4 and 5, a method is described for utilizing a multi-camera in accordance with the present invention in order to adjust the range of available stereoscopic imaging. FIG. 4 illustrates a multi-camera 22 including a pair of monocular apparatus 10a and 10b. The corresponding elements of apparatus 10a and 10b are described above with reference to FIGS. 1 and 2. In FIG. 4, the imager 14a is centered about a focal axis of the lens 12a and the imager 14b is centered about a focal axis of the lens 12b. Given this arrangement, the bounds (at least along the plane of the paper) of the view selection of the imager 14a are indicated by the lines 110 and 112, and the bounds (at least along the plane of the paper) of the view selection of the imager 14b are indicated by the lines 114 and 116. The hatched region 118 indicates range of available stereoscopic imaging available for the arrangement of FIG. 4.

Figure 5:
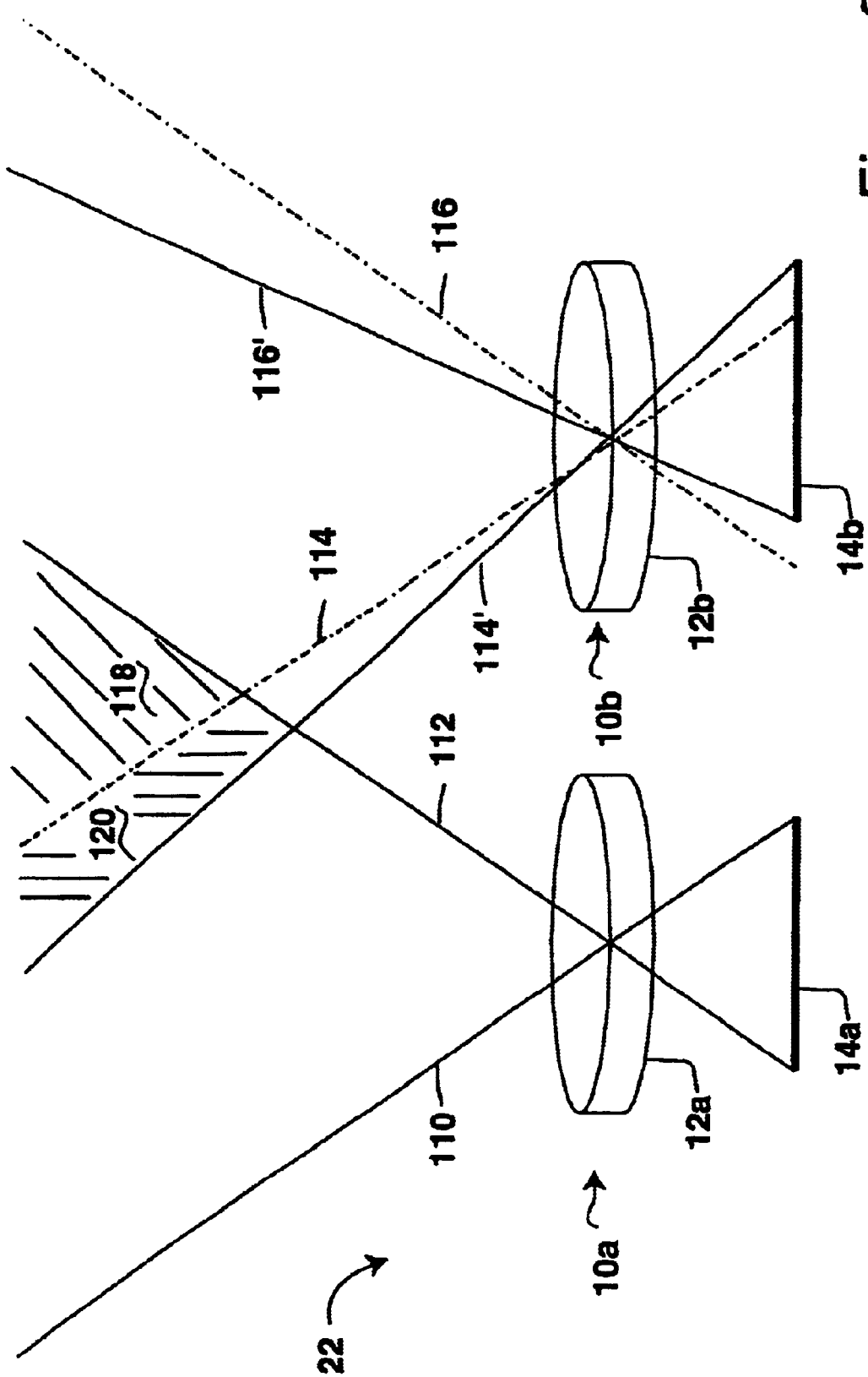

In FIG. 5, the imager 14b has been repositioned along the X axis and, as a result, the range of available stereoscopic imaging available for the arrangement of FIG. 5 includes not only the hatched region 118, but now includes the hatched region 120. By making similar adjustments along the Y axis, the range of available stereoscopic imaging can be varied as desired.

An important design consideration for the present invention is the realization that the alignment of multiple imagers for range computation is important (recall the discussion of parallel epipolar geometry in the background). However, it is contemplated that the multiple imagers may be built as independent components and arrayed as desired for particular ranging situations. Accordingly, the present invention teaches an alignment mechanism operable to align the multiple imagers in order to substantially meet the desired parallel epipolar geometry. One preferred alignment mechanism that will enable rapid alignment includes a laser diode system directed parallel to the imaging surface of and exiting a first imager housing the laser diode. When the imagers are properly aligned, the beam enters another imager, is reflected on to the next imager, and so on, such that the beam returns in a single plane of travel to the originating source. In this way, visual alignment of multiple imagers can be obtained to the sub-millimeter level with simple integrating signal processing and optimization at the detector elements, as will be appreciated by those skilled in the art.

Figure 6:
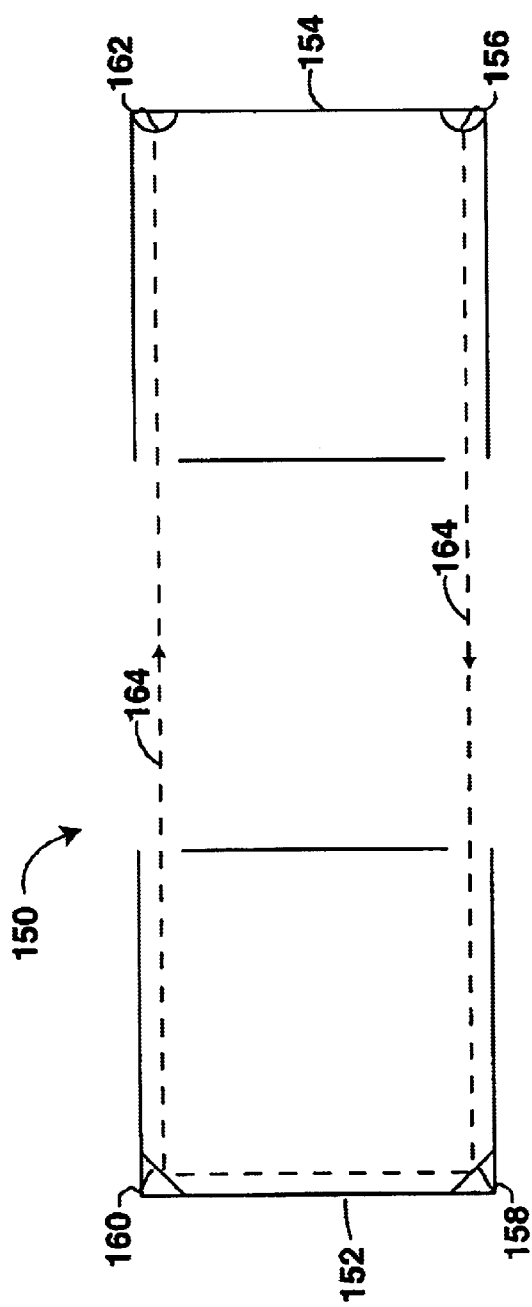
FIGS. 6 and 7 illustrate an alignment mechanism in accordance with one embodiment of the present invention.
Figure 7:
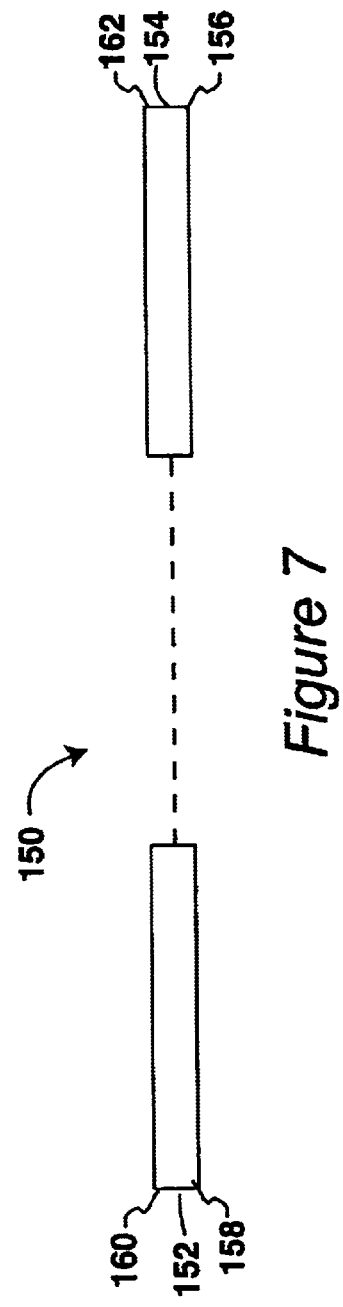

With reference to FIGS. 6 and 7 (top view and side view, respectively), an alignment mechanism 150 for aligning two moving imagers in accordance with one embodiment of the present invention will now be described. The alignment mechanism 150 is jointly housed within moving imagers 152 and 154 and includes a laser diode 156, mirrors 158 and 160, and a photosensor 162. The laser diode 156, the mirrors 158 and 160, and the photosensor 162 are arranged such that, when the moving imagers 152 and 154 are properly aligned, a beam of light 164 generated at the laser diode 156 is reflected within the moving imager 152 and directed back to the photosensor 162. Thus proper alignment can be achieved by adjusting the moving imagers 152 and 154 until the light beam 164 is detected at the photosensor 162. Mechanical position adjusters, such as those available from Newport Inc. of Irvine, Calif., may be used to effect the imager alignment.

Note that the alignment mechanism 150 locates the laser diode 156, mirrors 158 and 160, and the photosensor 162 within the imagers, as opposed to locating them externally. Doing so enables better alignment through properly machining the light paths internal to the imagers. As will further be appreciated, the strategy of FIGS. 6 and 7 can be adapted to align a multiplicity of imagers using a single laser diode and additional mirrors.

Another design consideration for the present invention is the realization that the precise measurement of location of the sensor is more important than positioning accuracy. For most view selections, there is no need to achieve a particular exact direction of view: an approximate direction will be sufficient. In other words, the sensor does not need to be at a specific position under the lens and yet, wherever the sensor is placed, knowledge of its position is preferred to a quite high precision (e.g. a tenth of a micron). As an illustrative example, the sensor array could be located at an arbitrary position with respect to the imaging plane, as long as the scene detail of interest is imaged and the system measures the imager's actual location with a high degree of precision. The precision of this placement determines the accuracy of the depth computed.

Yet another design consideration for the present invention is the realization that super-resolution computation is facilitated by having high positioning accuracy over a distance of about 1/2 pixel (see Tagami et al.'s U.S. Pat. No. 5,402,171). The alternative is quite acceptable (i.e. knowing to high precision where the other images contributing to the integration are located). But, knowing the displacements in advance and then using the known displacements during processing (for example, exactly one half pixel displacement in each direction) is a preferable solution.

There are a number of enhancements to the basic methods and apparatus described above with reference to FIGS. 1–7. It should be noted that the present invention includes an instantaneous wide-angle viewing capability. Due to this wide-angle viewing capability, the requirement of moving the imager over the whole field of view while integrating to obtain a full view is eliminated. Instead, preferably through use of a small positive-curvature converter lens between the lens and the imager, the full field of view is simultaneously projected onto the centrally-located sensor.

Another enhancement to the invention is the inclusion of a computer-controlled lens focusing mechanism, in addition to the back-plane focusing means provided by the platform out-of-plane motion, and this would preferably use stereo-computed range to determine focusing distance. Another enhancement is a computer-controlled zoom mechanism that will allow adaptive selection of effective field of view over a wide range of values. The implementation of computer-controlled lens focusing and zoom mechanisms are well known to those skilled in the art.

Thus one particular embodiment of the present invention includes a three-dimensional-adjusting imaging camera that has three motion platforms coupled for three-dimensional movement, a controller for moving the platforms separately or in concert, a measurement system for determining the location of the platforms in an external frame of reference, an imaging device positioned for three-dimensional displacements on the coupled platform, and a lens whose focal surface coincides with the imaging surface of the imaging device under three-dimensional movement of the motion platform and which has a field of coverage considerably larger than the optically sensitive area of the imaging device.

Figure 8:
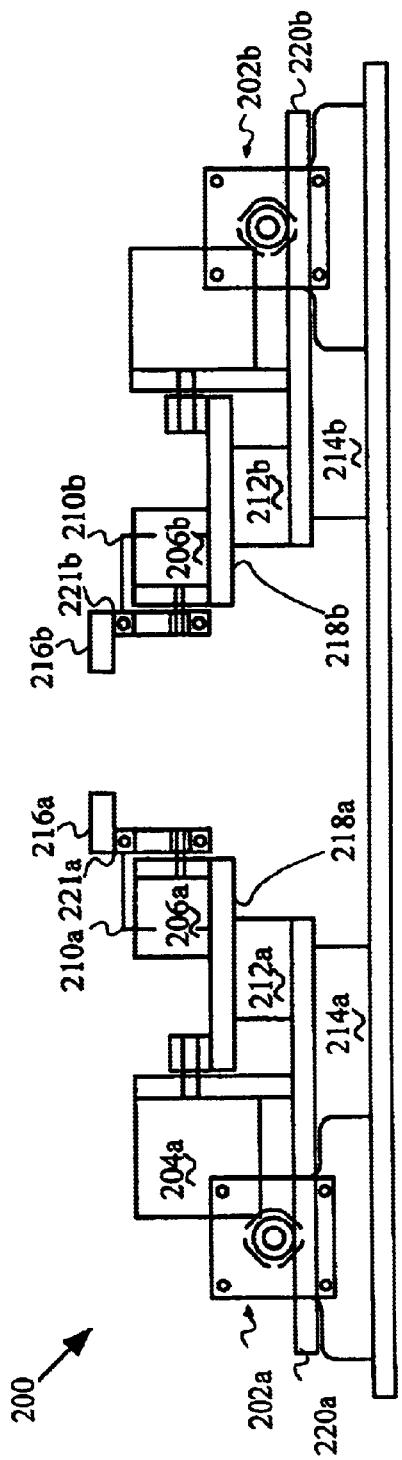
FIGS. 8 and 9 provide diagrammatic views of a multi-camera imager wherein each moving imager utilizes a three platform positioning mechanism.
Figure 9:
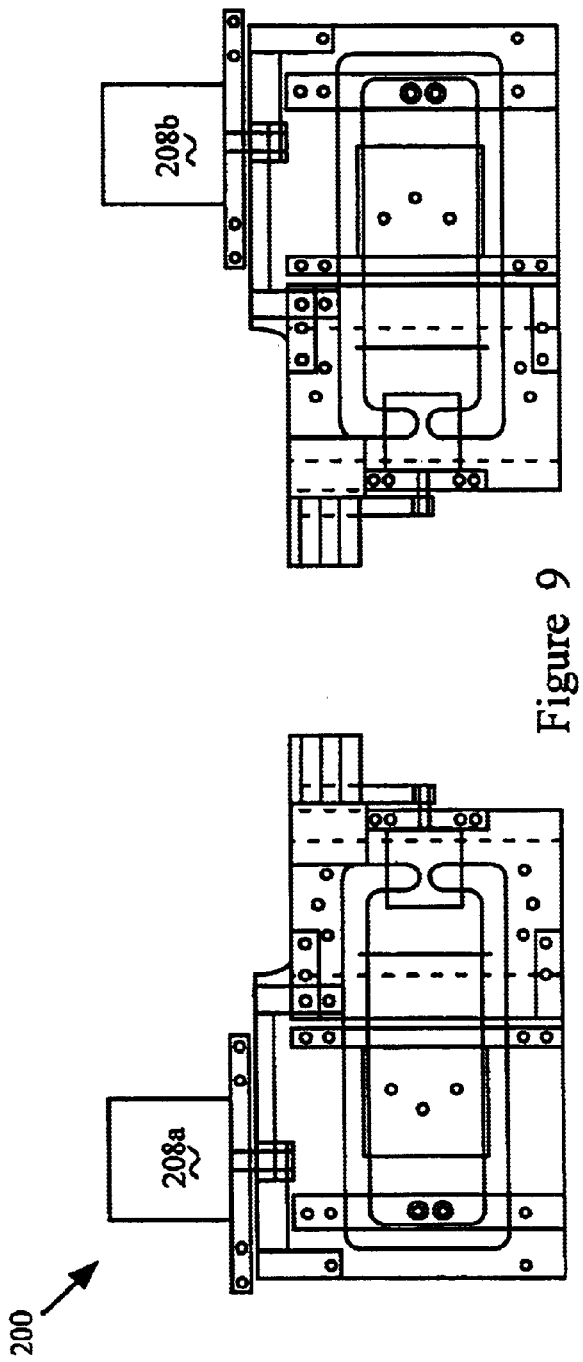

A three-dimensional-adjusting imaging camera 200 in accordance with such an embodiment will now be described with reference to FIGS. 8 and 9. The imaging camera 200 includes a pair of positionable imaging apparatus 202a and 202b that are operated in concert. The imaging apparatus 202a includes motors 204a, 206a, and 208a, linear slides 210a, 212a, and 214a, an imager 216a, and three platforms 218a, 220a, and 221a.

The motor 208a drives the platform 220a along the linear slide 214a, the motor 204a drives the platform 218a along the linear slide 212a, and the motor 206a drives the platform 221a along the linear slide 210a. The imager 216a is mounted upon a surface of the platform 221a. Motion along the linear slide 214a is perpendicular to motion along the linear slide 212a, but motion along both linear slides 212a and 214a is in-plane motion. Motion along the linear slide 210a is out-of-plane motion. Hence, in-plane positioning is effectuated by actuating the motors 204a and 208a, while out-of-plane motion is effectuated by actuating the motor 206a. Operation of the positionable imaging apparatus 202b is similar and should be self-evident.

The camera can be used for the automated tracking of objects in the field of view and the automated scanning of a field of view. In addition, the use of such a camera for integrating images from different positions can be used to develop higher resolution composite images of the field of view, and for the automated range computation to features and elements in the field of view. A lower-resolution version of the latter is preferably accomplished with a converting lens positioned between a primary lens and imaging device surface such that a large portion of the field of view of the lens is projected onto the optically sensitive area of the centrally-located imager.

As noted, the present invention may further include a computer controlled focusing mechanism aside from the back-plane focusing means. In addition, the camera of the present invention may further include a computer-controlled focal-length adjusting mechanism.

A further advantage accruing from moving the imagers under computational control is that shuttering and acquisition can be synchronized to ensure that images are free of motion blur—either from camera motion or from observed object motion.

The present invention has a great number of valuable applications in that any application of computational video processing, including observation, tracking, and stereo ranging, would benefit from many elements of the present camera design. These benefits include simplified stereo matching, the retention of a single frame of reference, high resolution and wide field of view with inexpensive off-the-shelf lenses, field of view selection without camera or lens movement, and super-resolution.

An alternative to the above-described imaging devices is an imaging device which utilizes a spherical lens. The human eye is the principal capture-device model for theoretical aspects of computer vision research. Unfortunately, imager fabrication constraints have prevented development of imaging devices that can exploit the geometry of this natural "device." Previously, researchers have typically only had access to planar focal-surface sensors such as those described above with reference to FIGS. 1–9.

Figure 10:
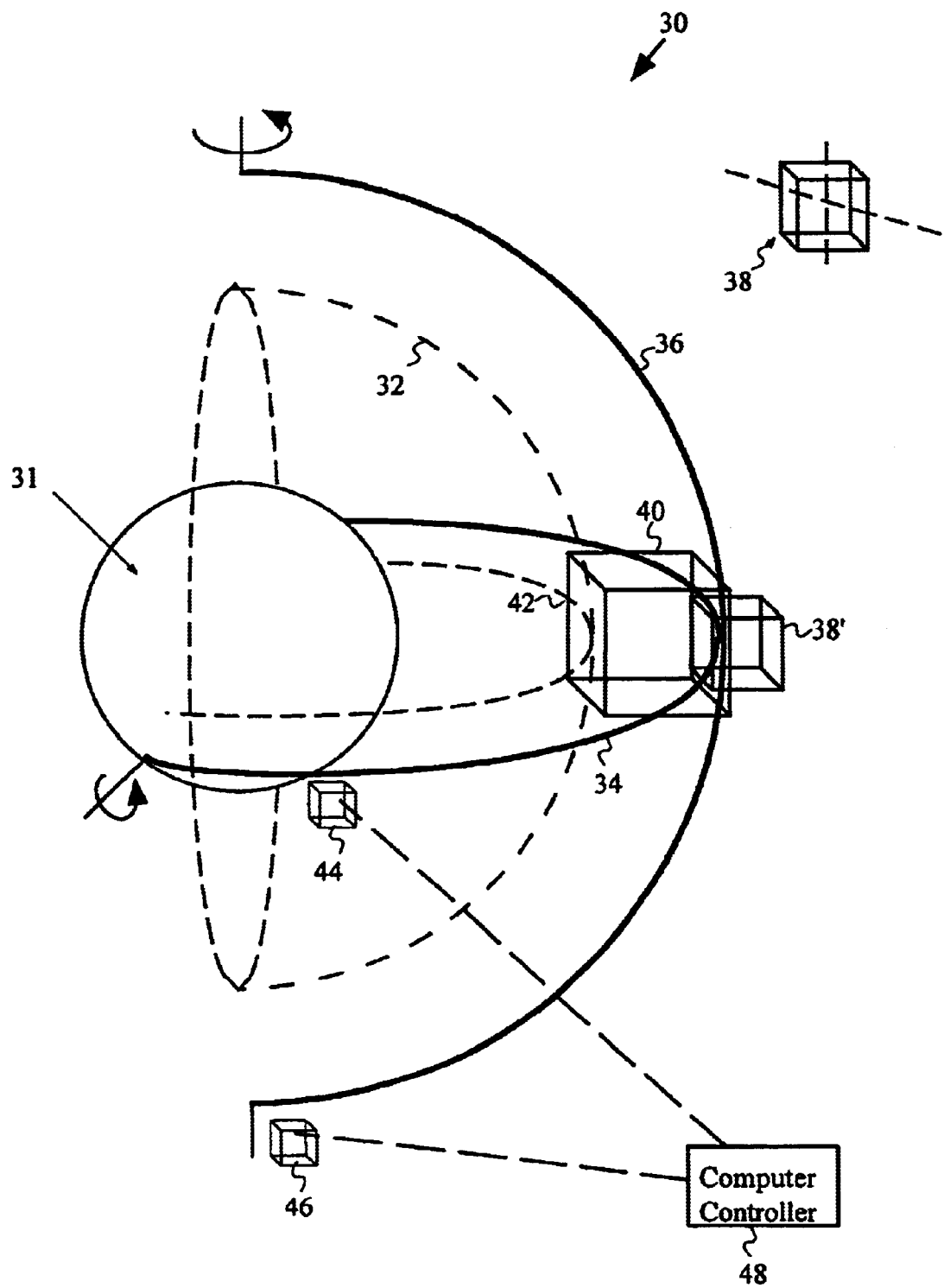
FIG. 10 is an illustration of a spherical imager of the present invention.

In FIG. 10, a camera 30 includes a spherical lens 31 centered on an arbitrary spherical coordinate system and having a lens focal sphere 32. The camera 30 further includes an elevation control axis 34 and an azimuth control axis 36. These axes may be implemented with curved control paths. A positioner 38 (shown here broken away for clarity) is attached to the axes 34 and 36 and is used to hold an imager 40 at the intersection of the axes. The actual position of positioner 38 is shown at 38'. A spherical-faced fiber-optic faceplate 42 is attached over the imager 40 to define the spherical image formation surface of the camera. An elevation controller 44 is coupled to the elevation control axis 34, and an azimuth controller 46 is coupled to the azimuth control axis 36. The elevation controller 44 and azimuth controller 46 are preferably computer controlled by a computer controller 48.

A curved focal surface, such as the retina and the spherical surface of the faceplate 42 described above, has a number of advantages for computational image processing, including: 1) excellent optical resolution attainable when the focal surface needn't be made planar; 2) the simplicity of rotational over linear displacements; 3) a greatly increased undistorted field of view; 4) exponentially less lens illuminance fall-off with eccentricity; 5) greater effective pan and tilt velocities; and 6) opportunity to study (via simulation) aspects of human psychophysical behavior.

With the present invention, the capture of spherical focal-plane imagery through, for example, the use of the spherical-faced fiber-optic faceplate 42 provides these and other benefits. The present invention provides a mechanism for exploiting this in a spherical-imaging camera that shares many of the design considerations of the above-described linear moving-imager camera. The present design uses a high resolution imaging device (1K by 1K elements with 12 bits of resolution at each pixel), mounted behind a fiber-optic faceplate that transfers the focal-plane light pattern to the sensor elements.

Rotational mechanisms allow azimuth and elevation controls on the imager-faceplate's position on a sphere, with mechanisms similar to those used in our linear-motion device described above for measuring this position to sub-pixel precision.

A suitable lens for this embodiment of the present invention is a ball lens, which is described in J. Baker's article entitled "Spherically Symmetrical Lenses and Associated Equipment for Wide Angle Aerial Photography," found in §16.1 of the Nov. 30, 1949, REPORT OF UNITED STATES OFFICE OF SCIENTIFIC RESEARCH AND DEVELOPMENT, NATIONAL DEFENSE RESEARCH COMMITTEE, which is incorporated herein by reference. Attachment of a fiber-optic faceplate to such a lens for astronomic study is described in Park et al.'s article entitled "Realtime Tracking System for the Wide-Field-of-View Telescope Project," found in SPIE VOL. 1111, ACQUISITION, TRACKING, AND POINTING III, 196–203 (1989) and Lewis et al.'s article entitled "WFOV Star Tracker Camera," found in SPIE VOL 1478, SENSORS AND SENSOR SYSTEMS FOR GUIDANCE AND NAVIGATION, 2–12 (1991), both of which are incorporated herein by reference.

A lens similar in design character, although with a narrower field of view, is manufactured by the Optical Corporation of America under the name "Wide Field-of-View Star Tracker." The curvature of the faceplate is selected by its radius from the center of rotation. Mapping of the resulting image geometry for binocular and motion disparity computation is straightforward, as will be appreciated by those skilled in the art. A smaller, lower resolution, and mechanically simpler version of this stereo eyeball camera may be attained by placement of a single imaging surface with fiber-optic faceplate behind each lens of the two-lens camera. As those skilled in the art will appreciate, rotation of the lenses and imagers in this eyeball system will not affect the frame of reference, as this imager's lenses have no single optical axis, and the interocular baseline remains fixed.

As well as being used for range computation, the spherical-imaging embodiment of the present invention can be advantageously used to study the human eye, examining elements of its motion, stereo, and even monocular processing: tracking, saccades, micro saccades, foveation, and other such aspects.

Another aspect of the present invention teaches a method for synchronization of the moving imager with image capture in order to decrease blur resulting from the imager's movement.

The concept of a moving image-capture device presents a problem in that moving while capturing induces blur. If capture of blurred images is to be avoided, control of the moving imager's motions must be synchronized with the image capture process. If this synchronization can be attained, it presents the possibility of minimizing blur in two forms. First, if all platform motion can be performed in the interval between image capture and the start of the next integration period, then no platform-induced motion blur will be observed—the imagers will be stationary while integrating. Second, if a moving object is to be imaged, then movements of the platform tailored to the motion of the object will enable higher resolution—minimal blur— imaging of it and anything else moving with its velocity. The preferred embodiment of the moving-imager camera synchronizes image integration and capture to minimize these capture artifacts.

As will be appreciated by those skilled in the art, video imagers generally operate at fixed scan frequencies. A usual mode of capture involves having the imager acquire light energy for a period of time (the integration time), and then to stop the integration process and transmit out the acquired information. The time between the stop of capture (the end of the integration) and the start of the next integration period presents an opportunity for platform motion. This time may be from six to tens of milliseconds, depending on the length of the next integration period. In certain embodiments of this invention, these timing signals are available to the moving imager controller, and platform motion is effected in the period between the termination of one integration period and the beginning of the next.

In another embodiment of this invention, the control signals to begin and end image integration are controlled by the moving imager computer such that integration is begun only after the intended motion is complete. Note that in the latter embodiment a fixed or standard image frame rate may not be attained but, for computational purposes as opposed to videography purposes, fixed or standard frame rates are not essential. Here, the quality and character of the acquired imagery are the important factors and, where a clear image is desired, the control method described will enable this capture.

The information used to control use and generation of these synchronization timing signals may come from measurement devices such as the interferometer or sonar-based systems described earlier, or from precalibration experiments in which the velocity and timing characteristics of the platforms are measured and tabulated for subsequent use.

While this invention has been described in terms of several preferred embodiments, there are alterations, permutations, and equivalents which fall within the scope of this invention. As will be appreciated by the above descriptions and the drawings, the imager control methods and apparatus of the present invention provide a stable frame of reference for monocular and multiple image computer analysis for high-precision tracking, scene scanning, and range computation over a wide field of view and with detail of interest at a wide variety of distances. However, it should be noted that those skilled in the art will realize that there are alterations, permutations, and equivalents as fall within the true spirit and scope of the present invention.

What is claimed is:

1. A moving imager camera comprising:
    a first positioning mechanism capable of three-dimensional movement;
    a first imaging device having an imaging surface, the first imaging device being mounted upon a surface of the first positioning mechanism such that the first imaging device moves in concert with motion of the surface of the first positioning mechanism;
    a first measurement system operable to determine a position of the first imaging device within an external frame of reference defined by three axes X, Y, and Z;
    a first lens having a focal surface and a field of coverage, the first lens arranged such that the focal surface coincides with the imaging surface of the first imaging device, the field of coverage of the first lens being larger than the optically sensitive area of the imaging surface; and
    a processor configured to perform an automated range computation to determine the distance from the camera to an object within the field of coverage, the automated range computation comprising comparing (1) data associated with a first set of image data generated by the first imaging device while in a first position of the first imaging device within the field of coverage of the first lens with (2) data associated with a second set of image data generated by the first image device while in a second position of the first imaging device within the field of coverage of the first lens;
    wherein the position of the first lens relative to the object remains fixed during the generation of the first set of image data and the second set of image data and the automated range computation is based at least in part on parallel epipolar geometry.

2. A moving imager camera as recited in claim 1 further including a computer system for controlling motion of the first positioning mechanism.

3. A moving imager camera as recited in claim 1 wherein the first positioning mechanism includes first and second platforms, the first platform operable to move along the X axis of the external frame of reference, the second platform operable to move along the Y axis, the surface of the first positioning mechanism being arranged such that the surface moves in concert with the first and second platforms.

4. A moving imager camera as recited in claim 3 wherein the first positioning mechanism further includes a third platform operable to move along the Z axis of the external frame of reference and the surface of the first positioning mechanism is an upper surface of the third platform.

5. A moving imager camera as recited in claim 3 wherein the first positioning mechanism further includes at least one actuator for actuating one of the first and second platforms.

6. A moving imager camera as recited in claim 5 further including a control system for controlling the operation of the at least one actuator.

7. A moving imager camera as recited in claim 6 wherein the at last one actuator is a stepper motor.

8. A moving imager camera as recited in claim 7 wherein the control system is a differential control system capable of microstepping the stepper motor.

9. A moving imager camera as recited in claim 6 wherein the at least one actuator is a servo motor.

10. A moving imager camera as recited in claim 1 wherein the imaging device is a digital imaging device.

11. A moving imager camera as recited in claim 10 wherein the digital imaging device includes a photosensitive integrated circuit, the photosensitive integrated circuit having an array of photosensitive elements that is the imaging surface of the imaging device.

12. A moving imager camera as recited in claim 11 wherein the photosensitive integrated circuit is operable to process signals generated at the array of photosensitive elements.

13. A moving imager camera as recited in claim 10 wherein the imaging surface of the first imaging device is an array of imaging pixels, the resolution of the array being at least 512 pixels by 512 pixels.

14. A moving imager camera as recited in claim 1 wherein the first measurement system includes an interferometer system operable to determine the position of the first imaging device in the focal plane.

15. A moving imager camera as recited in claim 1 wherein the first measurement system is a sonar based ranging system operable to determine the position of the first imaging device in the focal plane.

16. A moving imager camera as recited in claim 1 wherein the first lens is a lens designed for a 35 millimeter camera.

17. A moving imager camera as recited in claim 1 wherein the first lens is a lens designed for an advanced photo system (APS) camera.

18. A moving imager camera as recited in claim 1 further comprising a computer controlled focusing mechanism.

19. A moving imager camera as recited in claim 18 wherein the computer controlled focusing mechanism is a lens focusing mechanism.

20. A moving imager camera as recited in claim 18 wherein the computer controlled focusing mechanism is a back focusing mechanism.

21. A moving imager camera as recited in claim 18 wherein the computer controlled focusing mechanism uses stereo-computed range to determine focusing distance.

22. A moving imager camera as recited in claim 1 further comprising a computer controlled zoom mechanism providing adaptive selection of the effective field of view.

* * * * *